Nov. 12, 1935.   E. J. RUSH   2,020,741
PHOTO FLASH LIGHT DEVICE
Filed Jan. 11, 1932   2 Sheets-Sheet 1
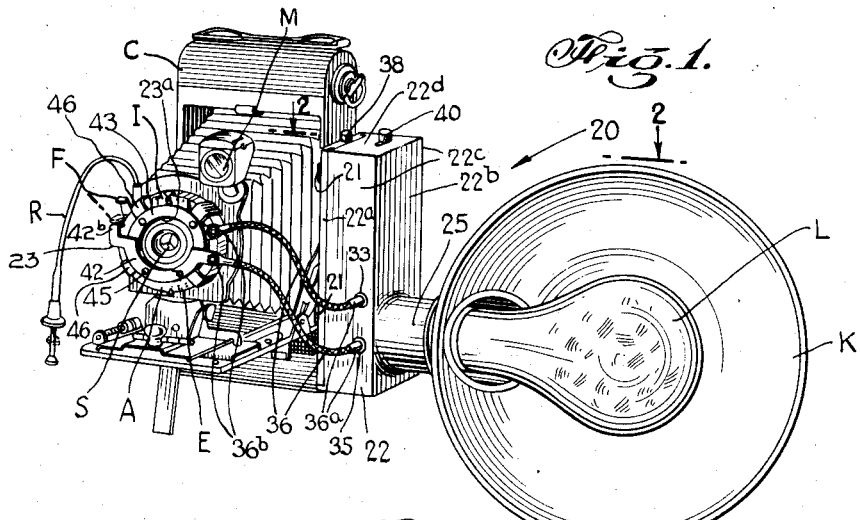
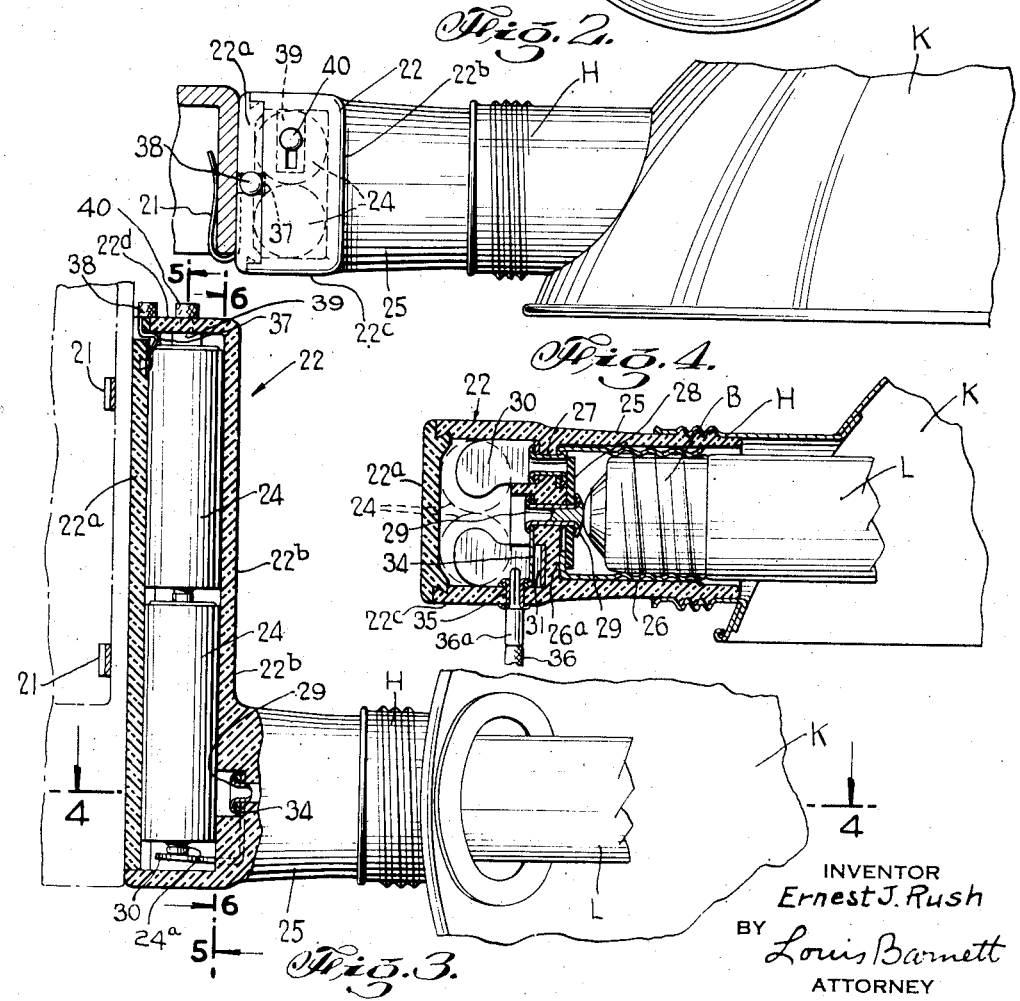
INVENTOR
Ernest J. Rush
BY Louis Barnett
ATTORNEY Nov. 12, 1935.  E. J. RUSH  2,020,741
PHOTO FLASH LIGHT DEVICE
Filed Jan. 11, 1932  2 Sheets-Sheet 2
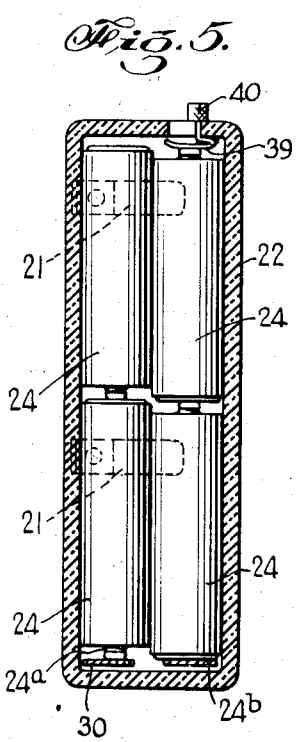
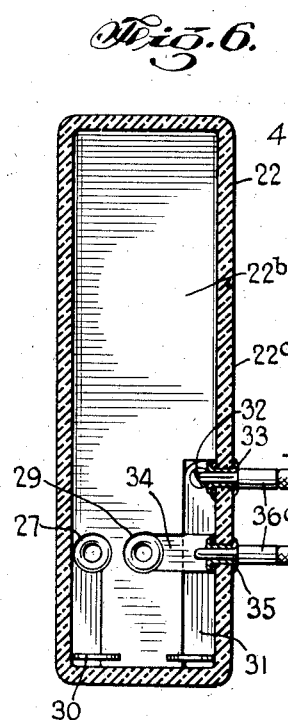
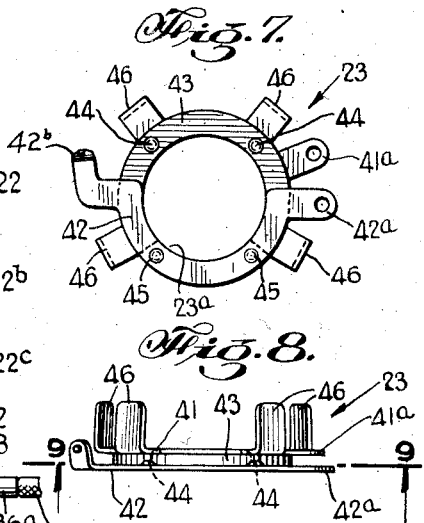
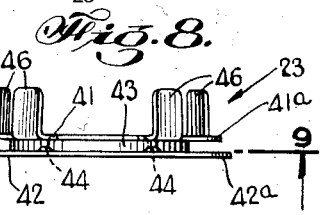
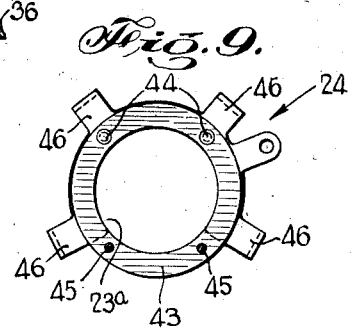
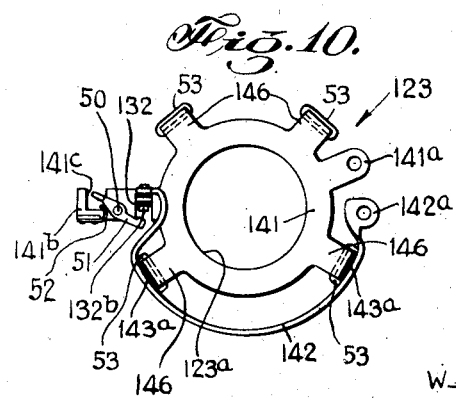
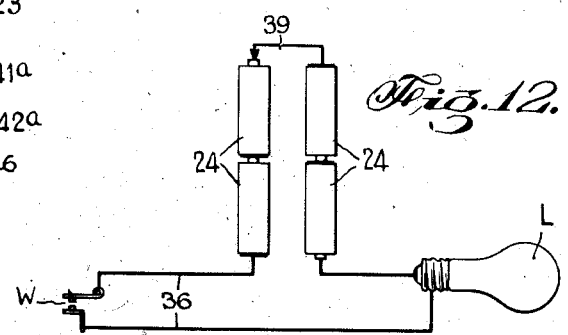
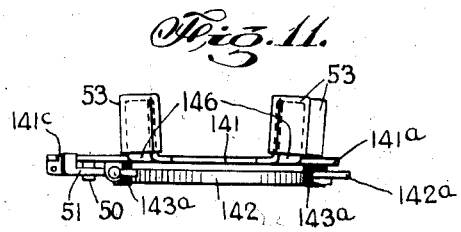
INVENTOR
*Ernest J. Rush*
BY *Louis Barnett*
ATTORNEY Patented Nov. 12, 1935

2,020,741

UNITED STATES PATENT OFFICE 2,020,741

PHOTO FLASH LIGHT DEVICE

Ernest J. Rush, New York, N. Y., assignor to Ella Barnett, New York, N. Y.

Application January 11, 1932, Serial No. 585,856

5 Claims. (Cl. 67—29)

This invention relates to photographic accessories and more particularly is directed to an improvement in a photo-flashlight device constructed to automatically set off an electrically ignited flashlight bulb or lamp on opening of the lens-shutter of a camera to produce artificial light for illuminating a subject being photographed.

Among the objects of the invention is to generally improve the construction of photo-flashlight devices of the character described which shall comprise few and simple parts, which shall be readily assembled to form a rugged dependable structure, which shall be quick and easy to demountably attach to camera lens-shutter of conventional construction for use by both professional and amateur photographers, which shall be cheap to manufacture, and practical and efficient in use.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which are shown various possible illustrative embodiments of this invention, Fig. 1 is a perspective view of a photo-flashlight device constructed to embody the invention shown attached to a conventional type of pocket folding camera in position for operation.

Fig. 2 is a top plan view of a fragmentary portion of the improved photo-flashlight device, portion of the camera casing being shown in section.

Fig. 3 is a front elevational view of a portion of the improved device shown in Fig. 2, the battery box and camera attachment clips being broken away to expose the interior construction, the camera casing being indicated in dotted lines.

Figs. 4, 5 and 6 are cross-sectional views taken on lines 4—4, 5—5 and 6—6, respectively, in Fig. 3.

Figs. 7 and 8 are front elevational and top plan views, respectively, of the improved lens-shutter attachment fitting.

Fig. 9 is a cross-sectional view taken on lines 9—9 in Fig. 8.

Figs. 10 and 11 are front elevational and top plan views of a modified form of lens-shutter attachment fitting, and Fig. 12 is a diagrammatic view of the electrical circuit employed in connection with the improved photo-flashlight devices.

Referring in detail to the drawings, 20 denotes an electric ignition photo-flashlight device adapted to set off the flashlight bulb or lamp L, and constructed to embody the invention. Said device 20 may be attached to any conventional type of adjustable lens-shutter mechanism of a camera, as for example to a housing E of a lens-shutter mechanism for a pocket folding camera C, said mechanism including a cable release R, and a finger release F for a self-timing adjustable shutter S enclosed in the housing E in which the camera lens is mounted in the well understood manner.

The device 20 as shown in Fig. 1, comprises a battery box 22 and a fitting 23 which are demountably attached on the camera C by any suitable means, spaced spring clips 21 being provided for attaching the battery box 22 and the fitting 23 being clamped to shutter housing E in the manner hereinafter described. Said spring clips 21 may project from a removable cover 22a of the box 22, the latter enclosing an electric power source, such as a battery of series connected cells 24. Said box 22 may be of any suitable construction and as here shown is made of molded insulating material preferably formed with a socket 25 projecting from a wall 22b thereof, said socket being adapted to receive the screw base B of the flashlight bulb or lamp L.

The socket 25 may include a husk portion integrally molded with a wall 22b of the box 22. Said socket husk portion surrounds a metallic contact screw shell 26 into which the lamp base B is threaded. The contact shell 26 is provided with an inturned flange 26a, which may be secured within the husk portion by suitable means, such as a metallic eyelet rivet 27. The shell contact 26 may also be retained in position by an insulating washer 28 seated against the flange 26a, said washer 28 being secured by an eyelet rivet 29 which serves as the center contact for the socket 25 and is adapted to connect with the center contact of lamp base B, as is clearly shown in Fig. 4.

The eyelet rivet 27 secures a spring contact 30 within the box 22 which connects the socket contact shell 26 with one terminal 24a of the battery cells 24. Another spring contact 31 is secured within the box 22, spaced from the spring contact 30 in any well understood manner, as by means of screw 32 threaded into the box wall 22b for connecting the other battery cell terminal 24b with a suitable binding post, such as a pin terminal 54.

receptacle 33, the latter being extended through the box wall 22c. The eyelet rivet 29 through a jumper 34 connects the center contact of the lamp B with a second pin terminal receptacle 35, which also extends through the box wall 22c adjacent terminal receptacle 33, said receptacles 33 and 35 being adapted to receive a pin connection 36a terminating flexible conductor wires 36, as is clearly shown in Figs. 1, 4 and 6.

If desired the box cover 22a may be provided with a suitable spring latch 37 having a handle 38 extending through the top side 22d of the box and a suitable battery switch 39 which also has a handle 40 extending up through the box top side 22d. As seen in Fig. 5, said switch 39 serves as a means for breaking the circuit between the battery cells 24 to prevent accidentally or prematurely setting off the flash lamp L.

The ends 36b of the conductor wires 36 opposite the pin connectors 36a connect with the outwardly extending binding screw lugs 41a and 42a of two current carrying, arcuately shaped members 41 and 42, respectively, said members being separated by an insulating ring 43. The members 41 and 42 may be separately secured to ring 43 by any suitable means as by spaced screws 44 and 45, respectively, thus forming the fitting 23 into an annular structure having a central opening 23a as shown in Figs. 7 and 8. The members 41 may extend substantially three-quarters the distance about the ring 43 and includes besides the binding screw lug 41a, suitable demountable attachment means for engaging the shutter housing E, as for example, a plurality of extending spring clamps 46, said clamps being spaced to leave both the conventional camera-timing adjustment means I and the lens-aperture adjustment means A unobstructed. The member 42 may be substantially semi-circular shape being formed with the binding screw lug 42a at one end and a projecting arm contact 42b on the diametrically opposite end.

The operation of the improved ignition device will now be apparent. After the camera C has been set up, and the completely connected device 20 applied thereto as shown in Fig. 1, with the fitting 23 mounted on the shutter housing E, the battery box 22 contained the battery cells 24 secured by the clips 21 to the camera casing, and the lamp L preferably provided with a shade K for projecting the light produced by the flash from the lamp L toward the subject being photographed, said shade K being retained to the socket 25 by a shade holder H, as shown in Figs. 2, 3 and 4, the camera C is directed by means for the finder M to the subject (not shown) to be photographed, and is focused in the well understood manner. The aperture is then adjusted at A and the self-timing at I, the latter preferably being set for single manual actuation of the shutter, commonly known, as "Bulb" and indicated by the letter "B". The battery switch 40 then can be closed. On actuating the cable release R or the finger release F, the shutter mechanism is opened for taking the picture of the subject. This actuation causes the finger release F to be depressed until it strikes the arm contact 42b (shown in dotted lines in Fig. 1), which acts to close the circuit of device 20 and to set off the flashlight in the lamp L, the shutter being opened a short interval before the finger release F touches the contact 42b. The closing of the circuit by the abutment of the finger release F with the contact arm 42b is completed through the metallic parts of the shutter mechanism, the current in said circuit passing from the spring clamps 46 of the member 41 into the housing E, through the shutter mechanism to the finger release F, and hence to the contact arm 42b of the member 42.

In Figs. 10 and 11, a modified form of fitting 123 is shown. Here said fitting is seen to comprise an annular metallic member 141 formed with the central opening 123a and having extending spaced spring clamps 146, binding screw lug 141a and a projecting shielding arm 141b, said lug 141a and the arm 141b being located on diametrically opposite sides of the member 141. A contact terminal 132b is carried on an underside therefrom of said arm 141b but insulated therefrom as at 132. Said terminal 132b connects with one end of a lead 142 which is secured to member 141, but is also insulated therefrom as at 143a. Said lead 142 terminates in a binding screw lug 142a. Pivotally mounted at 50 on the arm 141b, there is a metallic lever 51 adapted to swing against the contact terminal 132b for completing the circuit between the lugs 141a and 142a, said lever being retained normally in open circuit position by any suitable means as for example spring 52.

The fitting 123 serves the same purpose and in the identical manner as described above for fitting 23 except as hereinafter set forth. Said fitting 123 when applied to the camera C in place of fitting 23 shown in Fig. 1, is adapted to co-operate with the finger release F which on being actuated as described above passes into the slot 141c in the shielding arm 141b, depresses the lever 51 for abutting the latter with the contact terminal 132b to close the circuit of the device 20 and to set off the flash in the lamp L. In the construction of fitting 123, the lever 50 and contact terminal 132b form a switch which eliminates the necessity for making the shutter mechanism a part of electric circuit as does the fitting 23. The construction of the fitting 123 as described above also prevents closing the circuit except by the operation of the finger release F and its entrance in slot 141c for actuating the lever 51.

If desired the spring clamps 146 of fitting 123 may be provided with rubber gripping covers 53 to prevent slippage and to avoid marring or scratching the finished surface of the mechanism housing E.

In Fig. 12, a diagram of the circuit of the electric ignition device 20 is shown, W denoting the switch which co-operates with the finger release F of the lens-shutter mechanism, 36 the conductor wires, 24 the battery cells, 39 the battery switch, and L the flash lamp.

It will thus be seen that there is provided a device whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. An accessory adapted to be applied to a camera having a mounting fitted with a lens and shutter comprising an electric ignition device for photo-flashlights including a pair of current carrying members separated by an insulating material, and forming an annular structure having a central opening in register with the camera lens, one of said members having demountable attachment means adapted to engage the lens-shutter mounting of the camera, the other of said members having a portion adapted to extend in the path of movement of a shutter mechanism part, and terminals on each of said members for connecting conductor wires thereto.

2. In the combination with a camera having a mounting fitted with a lens and a shutter mechanism for said lens, of an electric ignition device having a switch portion demountably attached on said mounting for co-operating with a movable part of said mechanism to set off a flashlight on opening of the shutter during the picture taking operation, said switch portion being constructed and arranged with an opening for registering with said lens.

3. In combination with a camera having a mounting fitted with a lens and an adjustable self-timing shutter mechanism for said lens, of an electric flashlight set-off device demountably attached on said mounting having a normally open-circuited switch portion for co-operating with a movable part of said mechanism, said movable mechanism part being actuated by contact engagement to close the circuit through said switch portion to set off a flashlight during the open movement of the shutter, said device having an opening located to leave the lens free from obstructions.

4. In combination with a camera having a mounting fitted with a lens, a shutter mechanism for said lens and a photo-flashlight, of an electric ignition device interconnecting said mechanism with said flashlight, means for demountably attaching a portion of said device on the lens mounting, said switch portion being constructed and arranged with an opening for registering with said lens, and means for removably attaching another portion of said device and said flashlight on the camera at a spaced distance from said mounting.

5. In combination with a camera having a mounting fitted with a lens, a shutter mechanism for the lens having a movable part, of an electric ignition device adapted to set-off a photo-flashlight, said device having an opening in register with the lens and a switch portion adjacent said opening, and means for demountably attaching said switch portion on said mounting in the path of movement of said mechanism part for actuating said device thereby.

ERNEST J. RUSH.